US012524778B2

(12) United States Patent
Singh

(10) Patent No.: US 12,524,778 B2
(45) Date of Patent: Jan. 13, 2026

(54) METHODS AND SYSTEMS FOR SHARING DETECTED CHANGES IN ROADS USING BLOCKCHAINS

(71) Applicant: Woven by Toyota, Inc., Tokyo (JP)

(72) Inventor: Jaspal Singh, Hicksville, NY (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 14 days.

(21) Appl. No.: 18/213,517

(22) Filed: Jun. 23, 2023

(65) Prior Publication Data

US 2024/0428286 A1 Dec. 26, 2024

(51) Int. Cl.
*G06Q 30/0207* (2023.01)
*G07C 5/08* (2006.01)
*G08G 1/0967* (2006.01)

(52) U.S. Cl.
CPC ....... *G06Q 30/0216* (2013.01); *G07C 5/0816* (2013.01); *G08G 1/096791* (2013.01)

(58) Field of Classification Search
CPC ............. G06Q 30/0216; G07C 5/0816; G08G 1/096791
See application file for complete search history.

(56) References Cited

U.S. PATENT DOCUMENTS

| | | | |
|---|---|---|---|
| 2019/0279247 A1* | 9/2019 | Finken | H04L 9/0637 |
| 2020/0210623 A1* | 7/2020 | Bueno | H04L 9/3247 |
| 2021/0261117 A1* | 8/2021 | McFarland, Jr. | G08G 1/096791 |

FOREIGN PATENT DOCUMENTS

| | | | | |
|---|---|---|---|---|
| CN | 113015134 A | * | 6/2021 | .......... H04W 12/009 |
| CN | 113946622 A | | 1/2022 | |
| CN | 113099418 B | | 8/2022 | |
| KR | 102026580 B1 | | 9/2019 | |
| KR | 102183064 B1 | | 11/2020 | |
| KR | 102226951 B1 | | 3/2021 | |
| KR | 102227561 B1 | | 6/2022 | |
| WO | WO-2019152049 A1 | * | 8/2019 | ......... G01C 21/3848 |
| WO | 2020046797 A1 | | 3/2020 | |
| WO | WO-2020205597 A1 | * | 10/2020 | .......... B60W 30/182 |

OTHER PUBLICATIONS

HD Maps for Connected and Automated Vehicles: Enabling Technologies and Future Directions, Ghadeer Abdelkader, p. 91, IEEE (Year: 2023).*

* cited by examiner

*Primary Examiner* — Ilana L Spar
*Assistant Examiner* — Darnell A Pouncil
(74) *Attorney, Agent, or Firm* — Dinsmore & Shohl LLP

(57) ABSTRACT

Methods and systems are presented for sharing detected changes in roads using blockchains in a network. The network includes vehicles operable to detect a change in a road, a plurality of local blockchains, and a global blockchain. The vehicles are divided into groups of local vehicles. The plurality of local blockchains includes local blocks of changes, wherein after a first vehicle publishes a change of the road among a group of local vehicles, a block of the change is integrated into a local blockchain when at least a local threshold number of the local vehicles endorse the change. The global blockchain includes blocks of changes, wherein a block of the change is integrated into the global blockchain when at least a global threshold number of the vehicles endorse the change. A token is awarded to the first vehicle.

13 Claims, 8 Drawing Sheets

METHODS AND SYSTEMS FOR SHARING DETECTED CHANGES IN ROADS USING BLOCKCHAINS

TECHNICAL FIELD

The present disclosure relates to data-sharing technologies, and more particularly, to data-sharing technologies for vehicles.

BACKGROUND

Sharing data among vehicles can be used to improve the operation of vehicles, increase efficiency, and improve customer service with personalized information and support. Existing barriers for sharing among the vehicles include the uncertain value of the data and potential incompatibility among platforms of different models of vehicles. Therefore, a need exists for a system to effectively share data among the vehicles.

SUMMARY

In a first aspect, a network includes vehicles operable to detect a change in a road, and a global blockchain including blocks of changes. A block of the change is integrated into the global blockchain when the change is detected by a first vehicle that first published the change in the network and at least a threshold number of the vehicles endorse the change. A token is awarded to the first vehicle.

In a second aspect, a network includes vehicles operable to detect a change in a road, a plurality of local blockchains, and a global blockchain. The vehicles are divided into groups of local vehicles. The plurality of local blockchains includes local blocks of changes, wherein after a first vehicle publishes a change of the road among a group of local vehicles, a block of the change is integrated into a local blockchain when at least a local threshold number of the local vehicles endorse the change. The global blockchain includes blocks of changes, wherein a block of the change is integrated into the global blockchain when the change is included in a local block, and at least a global threshold number of the vehicles endorse the change.

In a third aspect, a method includes publishing a change of static features of a road in a network, where the change is detected by a first vehicle of the network, receiving endorsements of the change from vehicles of the network, determining whether at least a threshold number of the vehicles of the network endorse the change, and after determining that at least a threshold number of the vehicles of the network endorse the change, integrating a block of the change into a global blockchain of the network.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
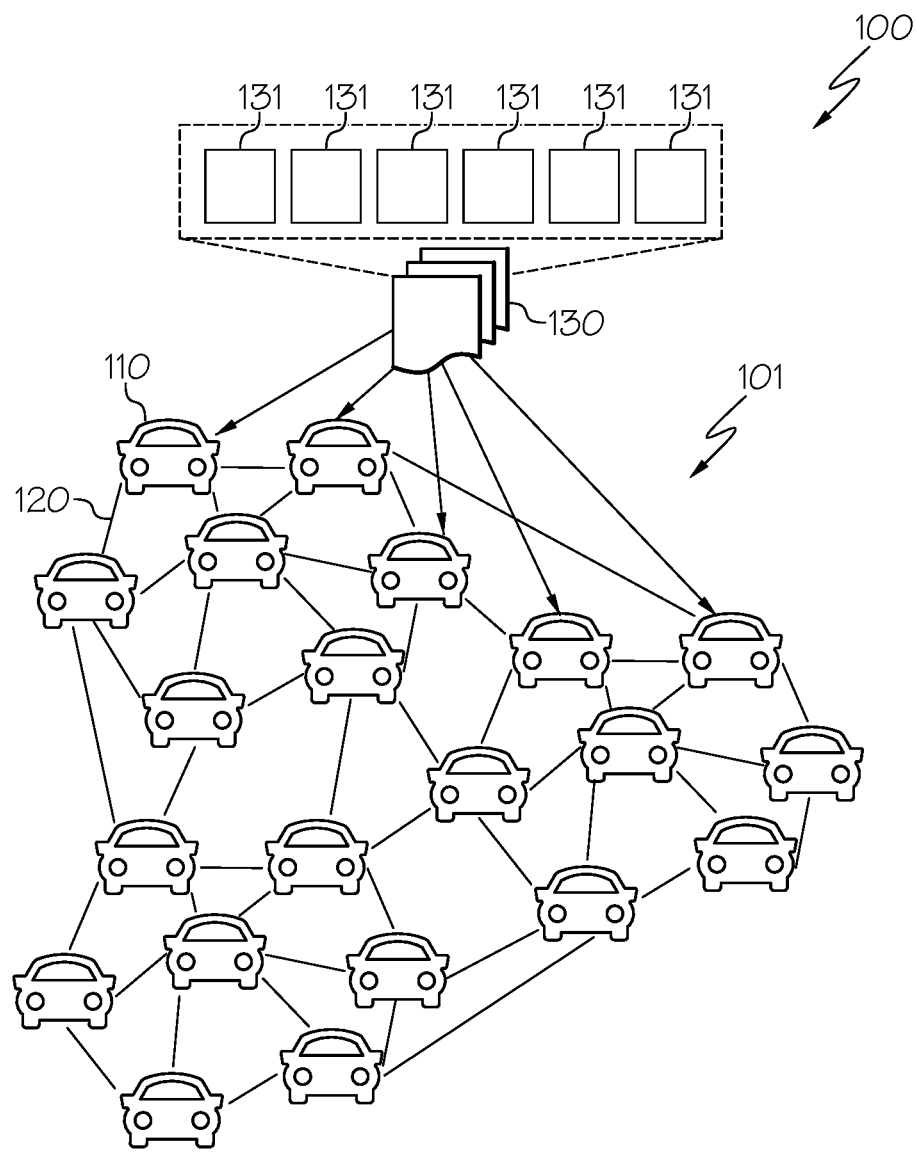
FIG. 1 schematically depicts an example decentralized vehicle network having a plurality of vehicles and a blockchain, according to one or more embodiments shown and described herein.

The embodiments described herein are directed to methods and systems of sharing detected changes in roads using blockchains in a decentralized vehicle network. The decentralized vehicle network that includes a plurality of vehicles having sensors to detect a change in a road and a blockchain includes blocks of changes. Vehicles first publishing a change of a road, such as geometric features of the road, traffic signs, or road constructions may be rewarded with a token after the reported change is endorsed by a portion of other vehicles in the network and integrated into the blockchain.

Vehicles use different map systems for navigation. For example, some vehicles may be equipped with a built-in navigation system that uses its own map data, while others might rely on smartphone apps or standalone global positioning systems (GPS) devices that use different map systems. It is possible that certain platforms may encounter compatibility problems between different vehicles using different map systems in data sharing, such as detected road conditions or static features of the roads. Further, vehicles driving on the road are generally private, and therefore so is the data collected by the vehicle. Although the sharing of information may contribute overall benefit of the drivers on the road, there are individuals preferring to keep their data within their collections. For example, after a vehicle encounters and passes a traffic accident scene, the vehicle has nothing to gain by sharing the information with other vehicles that may travel to the scene but would be delayed due to the road condition.

Utilizing blockchain technology in vehicles enables sharing of road condition data and updates on road features among vehicles with different models or map systems. This can enhance the accuracy, consistency, and cost-effectiveness of map updates across various map systems, leading to more reliable and up-to-date navigation information for drivers. Additionally, using blockchain technology to reward vehicles for sharing their detection can provide an incentive for people to share information.

The methods and systems of sharing detected changes of roads using blockchains disclosed herein provide universal detected changes of roads for all map systems so that all drivers have access to up-to-date maps. Further, the methods and systems of sharing detected changes of roads using blockchains disclosed herein create a reward system that motivates individuals to actively contribute to the sharing of detected changes of roads improving the quality and quantity of data available. This can lead to more accurate and up-to-date map information. Further, the use of blockchain and blockchain tokens or other forms of cryptocurrency can help ensure the integrity and security of the shared data, as the decentralized and immutable nature of blockchain makes it difficult to alter or manipulate data once it has been recorded.

Various embodiments of the methods and systems for sharing detected changes of roads using blockchains are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components unless the context clearly indicates otherwise.

As disclosed herein, a blockchain refers to an ever-growing set of data blocks. Each block may record a collection of data, such as endorsed changes in roads. The blockchain may distribute these endorsed changes across a group of member computers or vehicles equipped with controllers that may process and store the blocks of the blockchain. Each vehicle may maintain a copy of the endorsed changes. A blockchain may continuously grow the list of blocks, which are linked and secured using cryptography. The blockchain may be resistant to modification of the data. The blockchain may implement an open, distributed ledger that can record transactions between parties efficiently and in a verifiable and permanent way.

FIG. 1 generally depicts one embodiment of a decentralized vehicle network 100. The decentralized vehicle network 100 includes a plurality of vehicles 101. Each vehicle 110 is an independent node of the decentralized vehicle network 100. Each vehicle 110 connects any other vehicle 110 through a connection 120, which either vehicle 110 is a peer of another vehicle 110. The connections 120 allows the vehicles to communicate with each other. The vehicles 110 connected to each other are neighboring nodes or neighboring vehicles. In embodiments, the communication may follow a gossip protocol or a transmission control protocol. In a gossip protocol, a vehicle 110 communicates only to its neighboring vehicles through connections 120 to broadcast blocks or transactions. Once the vehicle 110 communicates with one of its neighboring vehicles with a detected change or other data, the neighboring vehicle may continue to communicate with other neighboring vehicles in the same manner until all vehicles 110 in the decentralized vehicle network 100 receive the same detected change or data. In the transmission control protocol, vehicles 110 communicate with each other directly through internet or wireless networks.

Figure 3:
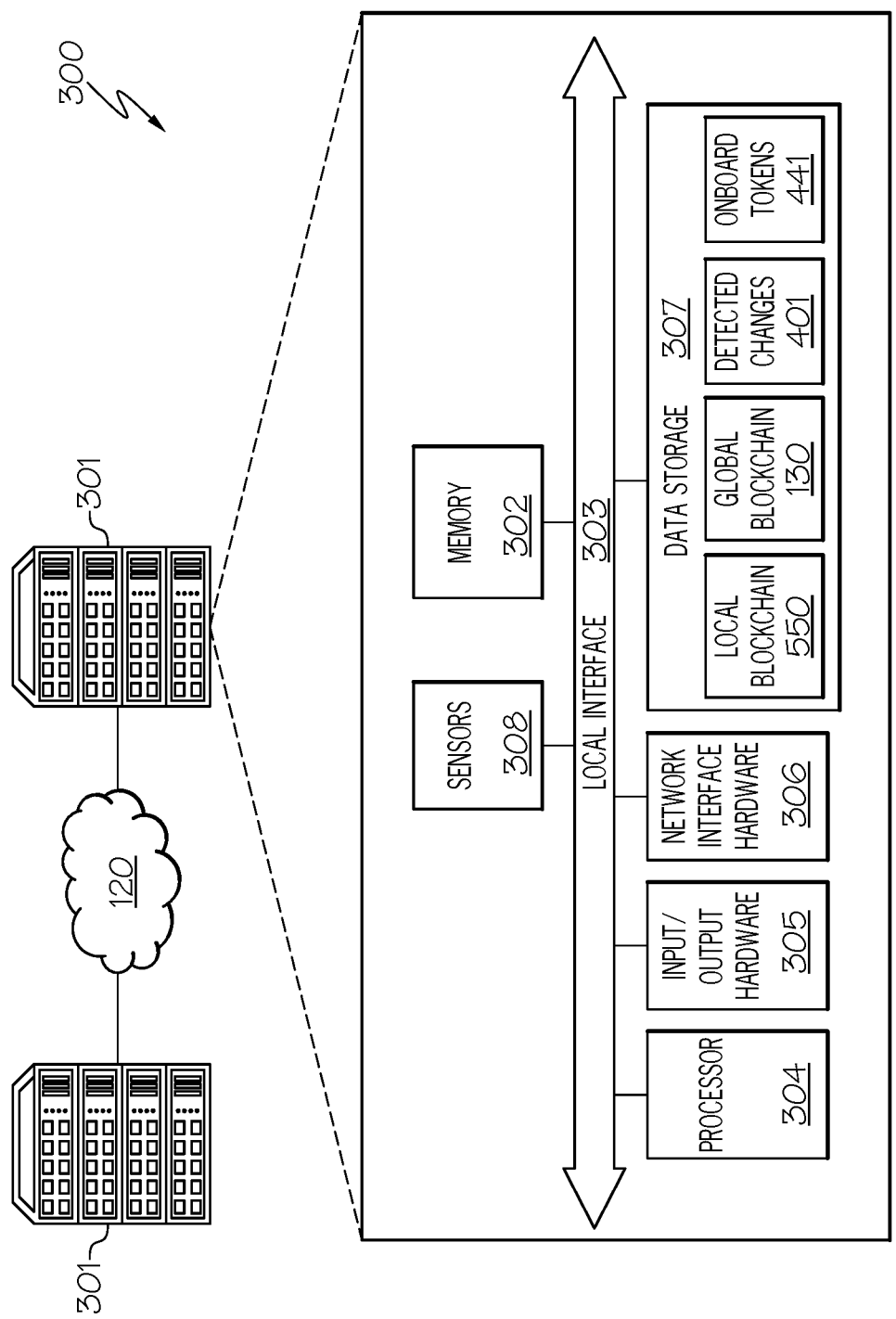
FIG. 3 schematically depicts non-limiting components of the devices on vehicles of the decentralized vehicle network, according to one or more embodiments shown and described herein.

The vehicles 110 in the decentralized vehicle network 100 may be, for example, automobiles, motorcycles, scooters, buses, recreational vehicles, boats, or other vehicles. The vehicles 110 each include sensors 308 (e.g. as illustrated in FIG. 3), such as location sensors, proximity sensors, cameras, radars, or ultrasonic sensors, capable of detecting and recording various states and conditions of the roads and environments around the vehicles. For example, the sensors 308 (e.g. as illustrated in FIG. 3) may detect and store data corresponding to a change in a road, location of the change (e.g., GPS coordinates), temperature, rain, snow, light levels, and sun position. The changes of the roads are pertaining to the static features of the roads, such as geometric features of the roads, traffic signs, lane lines, traffic lines, and mid- and long-term construction of the roads. A mid-term construction may span several months to a couple of years. A long-term construction may span several years or decades, involving large-scale infrastructure development. The mid-term and long-term construction activities may include residential or commercial constructions, renovation and remodeling projects, and infrastructure development such as building highways, bridges, tunnels, and airports. The data collected by the sensors 308 (e.g. as illustrated in FIG. 3) may be stored and/or analyzed by the respective vehicles 110.

The decentralized vehicle network 100 includes a global blockchain 130. The global blockchain 130 includes a plurality of blocks 131. The blocks 131 may be linked and secured using cryptography. Each block 131 may contain a cryptographic hash of the previous block, a timestamp, and information. Each block 131 stores a change of a road that is endorsed by at least a threshold number of the vehicles 110 in the decentralized vehicle network 100. The change may be pertaining to static features of the road. A threshold number of the vehicles 110 may be a concrete number of vehicles or a percentage number of vehicles.

The data, such as changes of roads, in the blocks may be shared with the plurality of vehicles 101 in the decentralized vehicle network 100. Each vehicle 110 may store a copy of the global blockchain 130 on the vehicle 110. However, a vehicle 110 may not write on the copy of the global blockchain 130 without endorsement from at least a portion of the plurality of the vehicles 101. The global blockchain 130 may be managed by the plurality of vehicles 101 collectively adhering to a protocol for inter-node communication and validating new blocks. Once recorded, the data in any given block may not be altered retroactively without the alteration of all subsequent blocks, which requires consensus among the plurality of the vehicles 101. The global blockchain 130 may include a main chain, which is the longest series of blocks from a start block to the current block, which is added latest. The global blockchain 130 may include orphan blocks outside the main chain. In certain cases, an orphaned block may be incorporated into the primary chain that is linked to a main chain block if it contains a verified record of a detected change that corresponds to the same event and location as the data stored in the main chain block.

Figure 2A:
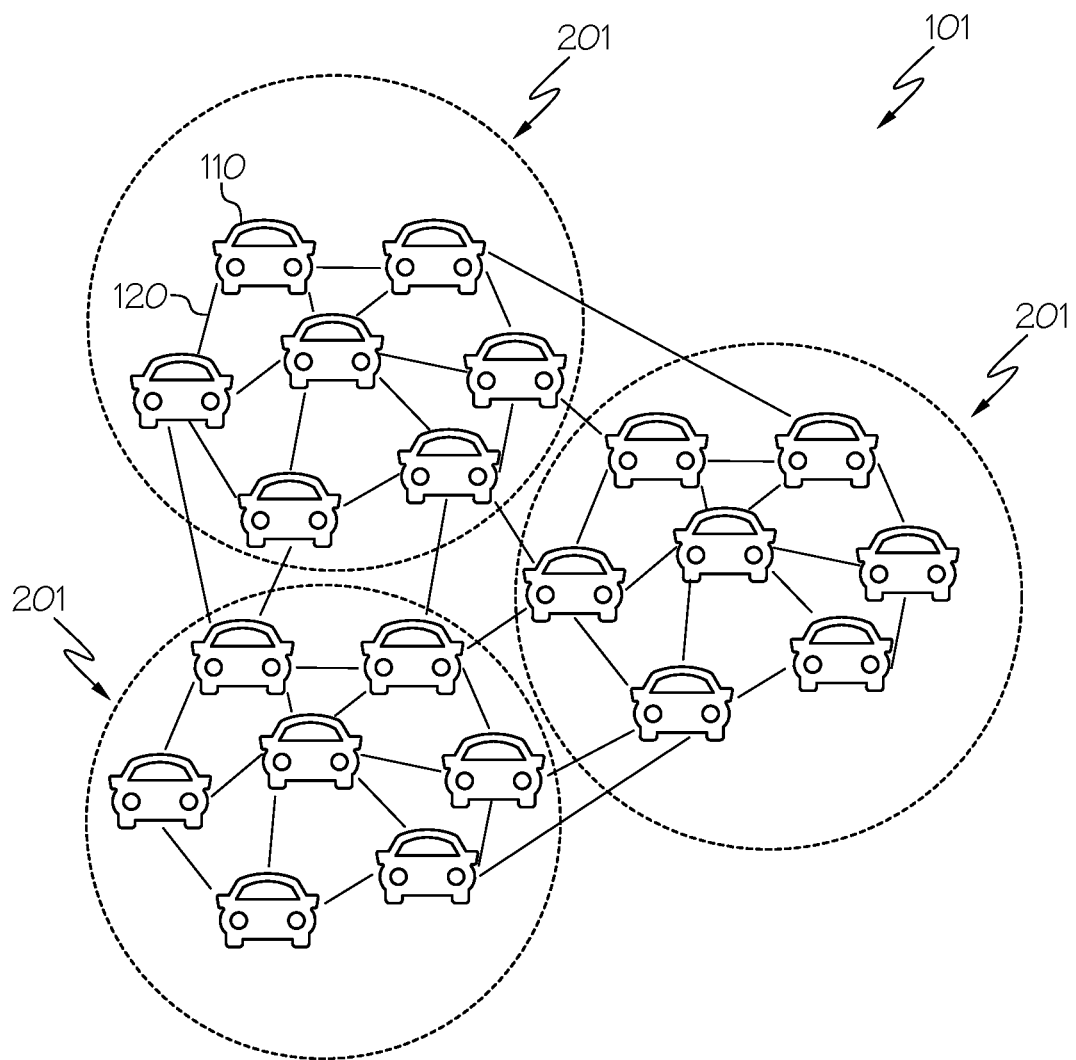
FIG. 2A schematically depicts an example grouping of the vehicles in the decentralized vehicle network into divided groups of vehicles having a peer-to-peer communication scheme, according to one or more embodiments shown and described herein.
Figure 2B:
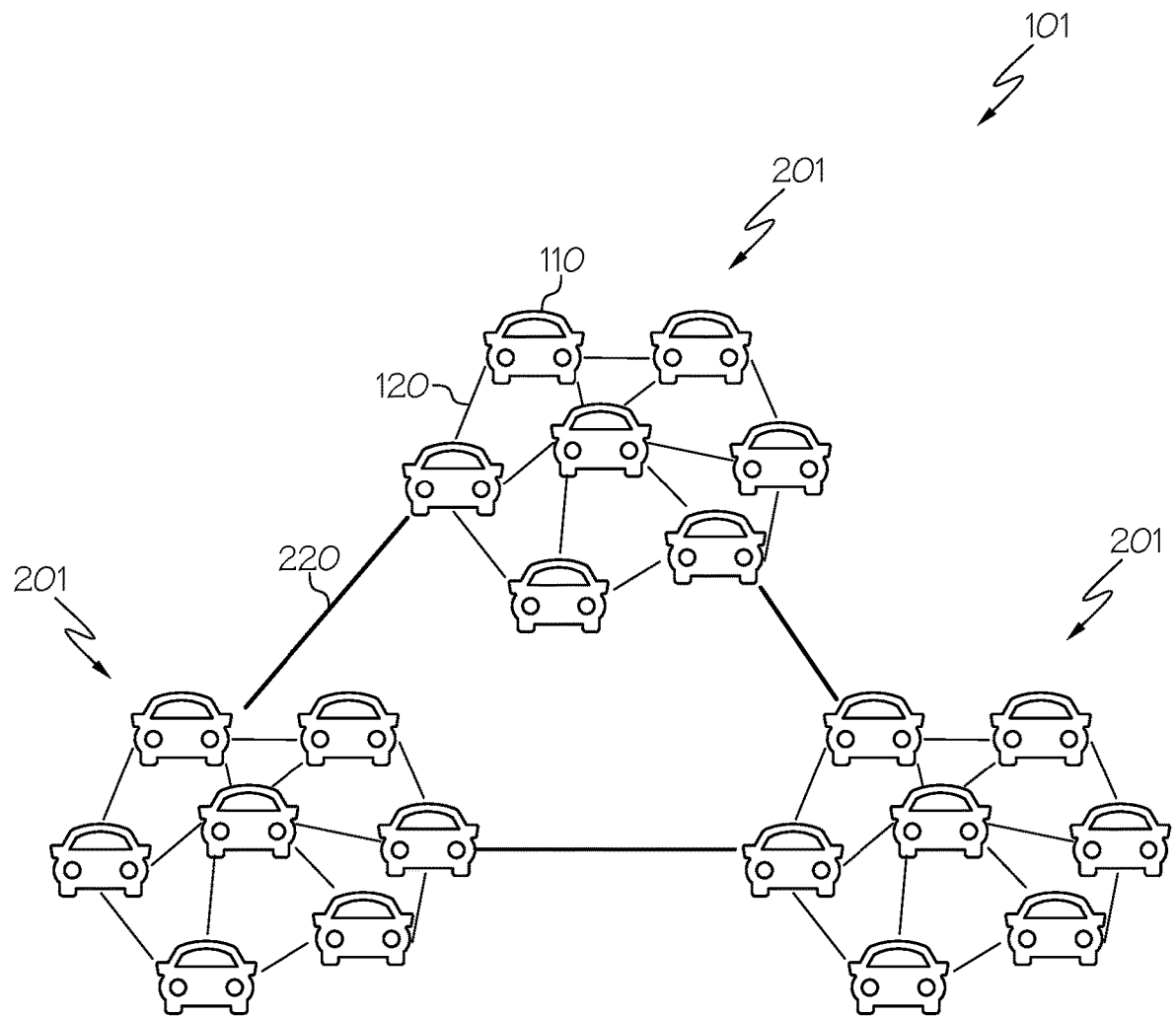
FIG. 2B schematically depicts an example grouping of the vehicles in the decentralized vehicle network into divided groups of vehicles having a group-to-group communication scheme according to one or more embodiments shown and described herein.

Referring to FIGS. 2A and 2B, examples of divided groups 201 of the plurality of vehicles 101 in the decentralized vehicle network are depicted. The plurality of the vehicles 101 of the decentralized vehicle network 100 (e.g. as illustrated in FIG. 1) may be divided into divided groups 201 of vehicles 110. Each divided group 201 may include at least one vehicle 110. The vehicles 110 of a divided group 201 are denoted as local vehicles if the grouping is based on the locations of the vehicles. The grouping may also be based on vehicle type, service provider, communication network, equipped sensors, or other similar conditions. As further disclosed below, the decentralized vehicle network 100 (e.g. as illustrated in FIG. 1) may select a grouping strategy that allows the vehicles 110 of a divided group 201 to have a greater chance to verify a reported change, for example, based on the location of the vehicles 110.

Figure 4:
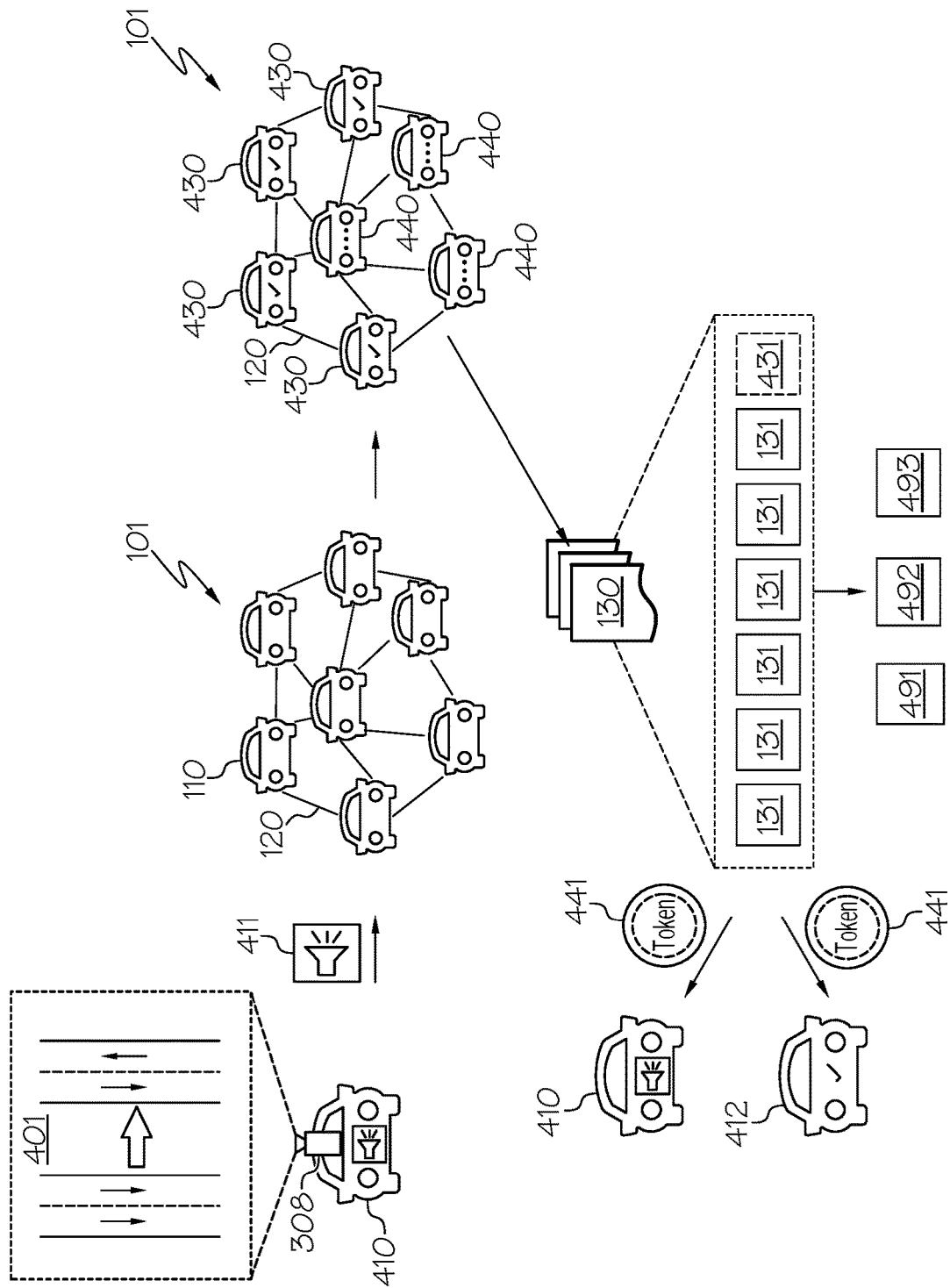
FIG. 4 depicts an example graphical representation of the operations of the decentralized vehicle network, according to one or more embodiments shown and described herein.

The divided groups of vehicles may have different communication schemes between vehicles belonging to different divided groups, such as a peer-to-peer communication scheme and a group-to-group communication scheme. In some embodiments, a vehicle 110 in a divided group 201 may directly communicate with a vehicle 110 in another divided group 201 (i.e., a peer-to-peer communication scheme). For example, as illustrated in FIG. 2A, the plurality of the vehicles 101 are divided into three divided groups 201. Connections 120 exist between the vehicles 110 at the edge of a divided group with other vehicles belonging to another divided group. In such case, communications crossing the group boundary may not require an agreement between the vehicles 110 within the divided group 201. In some other embodiment, a vehicle 110 in a divided group 201 may be restricted to communicate with the vehicles 110 within the divided group, and the divided group as a whole communicates with another divided group (i.e., group-to-group communication scheme). For example, as illustrated in FIG. 2B, a vehicles in a divided group 201 do not directly connect to another divided group 201. Instead, the divided groups 201 connect with each other through group connections 220. In such case, a group condition may need to be met. For example, when a vehicle 110 in a divided group 101 detects a change in a road, such as a change of driving direction in a lane (e.g. as illustrated in FIG. 4), the vehicle 110 cannot communicate to vehicles outside the network until a group condition is met. Such group conditions may be met by a majority vote or a consensus algorithm on whether to communicate with another divided group 201. Once the group condition is met, the vehicles 110 in the divided group 201 can communicate with vehicles 110 in other divided groups 201.

Referring to FIG. 3, non-limiting components of the devices 300 on vehicles of the decentralized vehicle network are depicted. A controller 301 of a vehicle in the decentralized vehicle network may connect with a controller 301 of another vehicle through a connection 120. The controller 301 may comprise various components, such as a memory 302, a processor 304, an input/output hardware 305, a network interface hardware 306, a data storage component 307, and a local interface 303. The controller 301 may various sensors 308, such as proximity sensors, camera, location sensors, temperature sensors, light sensors, and radar.

The controller 301 may be any device or combination of components comprising a processor 304 and a memory 302, such as a non-transitory computer readable memory. The processor 304 may be any device capable of executing the machine-readable instruction set stored in the non-transitory computer readable memory. Accordingly, the processor 304 may be an electric controller, an integrated circuit, a microchip, a computer, or any other computing device. The processor 304 may include any processing component(s) configured to receive and execute programming instructions (such as from the data storage component 307 and/or the memory component 302). The instructions may be in the form of a machine-readable instruction set stored in the data storage component 307 and/or the memory component 302. The processor 304 is communicatively coupled to the other components of the controller 301 by the local interface 303. Accordingly, the local interface 303 may communicatively couple any number of processors 304 with one another, and allow the components coupled to the local interface 303 to operate in a distributed computing environment. The local interface 303 may be implemented as a bus or other interface to facilitate communication among the components of the controller 301. In some embodiments, each of the components may operate as a node that may send and/or receive data. While the embodiment depicted in FIG. 3 includes a single processor 304, other embodiments may include more than one processor 304.

The memory 302 (e.g., a non-transitory computer-readable memory component) may comprise RAM, ROM, flash memories, hard drives, or any non-transitory memory device capable of storing machine-readable instructions such that the machine-readable instructions can be accessed and executed by the processor 304. The machine-readable instruction set may comprise logic or algorithm(s) written in any programming language of any generation (e.g., 1GL, 2GL, 3GL, 4GL, or 5GL) such as, for example, machine language that may be directly executed by the processor 304, or assembly language, object-oriented programming (OOP), scripting languages, microcode, etc., that may be compiled or assembled into machine readable instructions and stored in the memory 302. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. For example, the memory component 302 may be a machine-readable memory (which may also be referred to as a non-transitory processor-readable memory or medium) that stores instructions that, when executed by the processor 304, causes the processor 304 to perform a method or control scheme as described herein. While the embodiment depicted in FIG. 3 includes a single non-transitory computer-readable memory 302, other embodiments may include more than one memory module. Such program modules may include, but are not limited to, routines, subroutines, programs, objects, components, and data structures for performing specific tasks or executing specific abstract data types according to the present disclosure as will be described below.

The input/output hardware 305 may include a monitor, keyboard, mouse, printer, camera, microphone, speaker, and/or other device for receiving, sending, and/or presenting data. The network interface hardware 306 may include any wired or wireless networking hardware, such as a modem, LAN port, Wi-Fi card, WiMax card, mobile communications hardware, and/or other hardware for communicating with other networks and/or devices.

The data storage component 307 stores data such as local blockchain 550, global blockchain 130, changes 401, tokens 441, communication data between the vehicles, and data generated by the sensors.

Referring to FIG. 4, an example graphical representation of the operations of the decentralized vehicle network is depicted. A block 431 of the change 401 is integrated into the global blockchain 130 when the change 401 is detected by a first vehicle 410 that first reports 411 the change in the decentralized vehicle network 100 (e.g. as illustrated in FIG. 1) and at least a threshold number of the vehicles 110 endorse the change 401. In one example, a token 441 is awarded to the first vehicle 410. Another token 441 is awarded to a lucky vehicle 412. The lucky vehicle 412 is randomly selected from the endorsing vehicles 430 that endorse the change 401.

The vehicles 110 of the plurality of vehicles 101 may include sensors 308 (e.g. as illustrated in FIG. 3), such as proximity sensors, cameras, light detection and ranging (LiDAR) sensors, and the like that are operable to automatically detect a change 401 in a road. A change 401 may be pertaining to static features of the road. For example, the change may be related to geometric features of the road, traffic signs on the road, and mid- and long-term constructions of the road. The geometric features may include pavement widths, horizontal and vertical alignment, slope channelization, intersections, and other features that affect the operations, safety, and capacity of the roads. As illustrated in FIG. 4, the vehicle 410 detects a change 401 of a road that at one location, the driving direction of a road has changed from a one-way drive to a two-way drive. The vehicle 410 then decides to report the change 401 in the decentralized vehicle network. The vehicle 410 becomes a first vehicle when no other vehicle 110 in the decentralized vehicle network has reported the change 401.

In embodiments, the decentralized vehicle network 100 (e.g. as illustrated in FIG. 1) published the change, the change may be received by the vehicles 110 in the decentralized network via different approaches. For example, under the transmission control protocol, the change may be directly received via the Internet or wireless networks independently from the connections 120 from the neighboring vehicles. Under the gossip protocol, the data of the change may first be communicated to the neighboring vehicles of the first vehicle through the connections 120, then be communicated to the neighboring vehicles of the vehicles that received the data of the change 401 until all the vehicles 110 in the decentralized vehicle network receive the data of the change 401.

After the publication and receiving of the change 401, the vehicles 110 may vote for the change 401. The vote may be positive, neutral, or negative. A vehicle 110 that detects the same change 401 may vote positively to endorse the change 401. The vehicles 110 voting positively are endorsing vehicles 430. In FIG. 4, there are four endorsing vehicles 430. A vehicle 110 other than the first vehicle 410 is operable to endorse the change by detecting the change using a sensor, such as a proximity sensor. The first vehicle 410 may be operable to endorse the change by redetecting the change using a sensor. The redetection may be fulfilled by detecting the change during a revisit of the scene of the change. The redetection may also be fulfilled by detecting the change using a different sensor other than the sensor that first discovers the change. For example, the first vehicle 410 may be equipped with a camera and a radar. Both the camera and the radar detect the change 401 of the road. The same change detected by the radar may be used to endorse the change detected by the camera.

A vehicle 110 does not detect the same change 401 may vote neutrally or negatively to not endorse the change. The vehicles 110 vote neutrally or negatively are non-endorsing vehicles 440. In FIG. 4, there are three non-endorsing vehicles 440. In some embodiments, the decentralized vehicle network may consider a negative vote to endorse against the change and reduce the total endorsing number accordingly. The total endorsing number may be equal to the total number of positive voting minus the total number of negative voting. The decentralized vehicle system may use the total endorsing number in the same manner as the number of vehicles endorsing the change in determining whether to integrate a block into a blockchain.

After all or at least a majority of vehicles 110 vote for the change, the decentralized vehicle network may determine whether to integrate a block 431 that contains the change reported by the first vehicle into the global blockchain 130. The decentralized vehicle network may agree to integrate the block 431 if at least a threshold number of the vehicles 110 in the decentralized vehicle network 100 endorse the change (i.e. vote positively) or at least a threshold number of total endorsing number is reached. A threshold number may be a concrete number of vehicles or a percentage number of vehicles. A threshold number of vehicles may be set to a specific concrete number, which may be any number. In embodiments, the concrete number may range from two to a thousand. The concrete number may be a specific set of values, such as, without limitation, 2, 4, 6, 8, 10, 20, 40, 80, 100, 200, 400, 600, 800, 1000 or any number in between. Similarly, a threshold number of vehicles may be set as a percentage of the total number of vehicles in the network, which may range from 1 to 100. In embodiments, the percentage number may be a specific set of values, such as 5, 10, 20, 30, 40, 50, 60, 70, 80, 90, or 100. The choice of a concrete number or a percentage number as the threshold number of the vehicles may depend on various factors, such as the size of the decentralized vehicle network 100, the density of nodes, the desired level of communication efficiency, and the reliability of the changes integrated into the blockchain. In some embodiments, the threshold number of the vehicles is based on the vehicles that may reach the scene of the change.

In the embodiment as illustrated in FIG. 4, the threshold number of the vehicles may be 4 vehicles or 50% of the vehicles. After determining that four endorsing vehicles 430, the decentralized vehicle network finds that at least a threshold number of the vehicles endorse the change, and integrate a block 431 into the global blockchain 130 including a main chain of blocks 131.

Occasionally, the decentralized vehicle network may publish a change that is previously reported by another vehicle 110. In such a case, the published change may be integrated into an orphan block connected to a main chain block that contains the same change.

After block 431 is integrated, the global blockchain 130 may be updated throughout the plurality of the vehicles 101 and delivered to various vendors 491, map systems 492, or servers 493 for applications of the changes, such as map updates. Further, a token 441 may be awarded to the first vehicle 410. Another token 441 may be awarded to a lucky vehicle randomly selected from the vehicles that endorse the change. Occasionally, more than one tokens may be awarded to the first vehicle 410 when the change 401 is validated as a road infrastructure modification. The road infrastructure modification is the process of making changes or improvements to the physical elements of a road system. The road infrastructure modification may be related to the safety and efficiency of the road usage, such as widening or narrowing the road, adding or removing intersections, changing the direction of the traffic flow, realigning the road, upgrading the road surface, changing the speed limit, or adding or removing bike lanes or sidewalk. The road infrastructure modification may be validated by the decentralized vehicle network in a similar manner as the endorsement of the change or by out-of-network systems, such as Internet of Things (IoT) systems. The decentralized vehicle network may publish and update reputations of the vehicles 110 based on owned tokens of each vehicle. A vehicle 110 may request the decentralized vehicle network provide a service in exchange for at least one token. The decentralized vehicle network may provide services, such as upgrading onboard map systems, voting, and accessing to platforms.

Figure 5A:
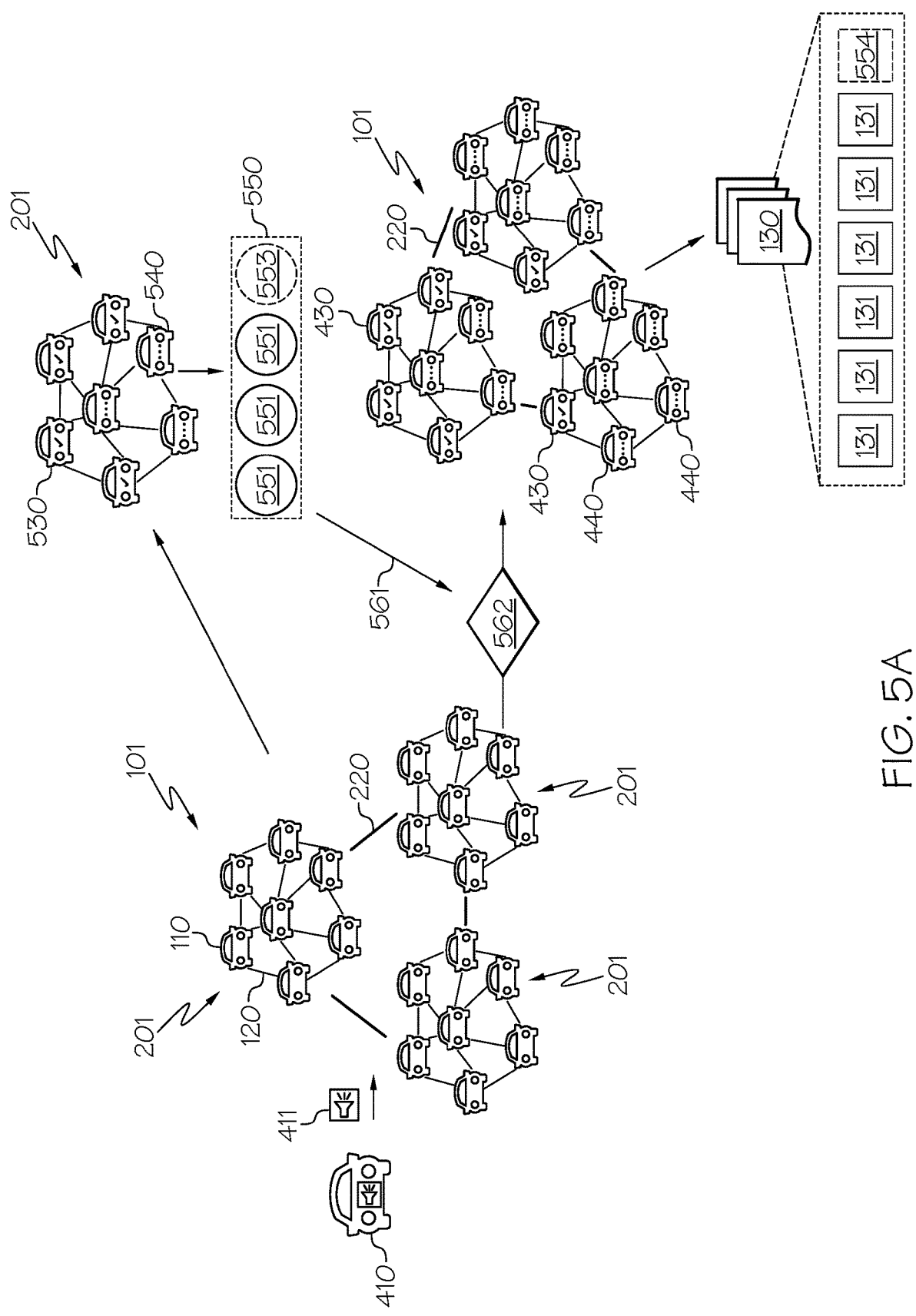
FIG. 5A schematically depicts an example graphical representation of the operations of the decentralized vehicle network having divided groups of vehicles with peer-to-peer communication scheme, according to one or more embodiments shown and described herein.
Figure 5B:
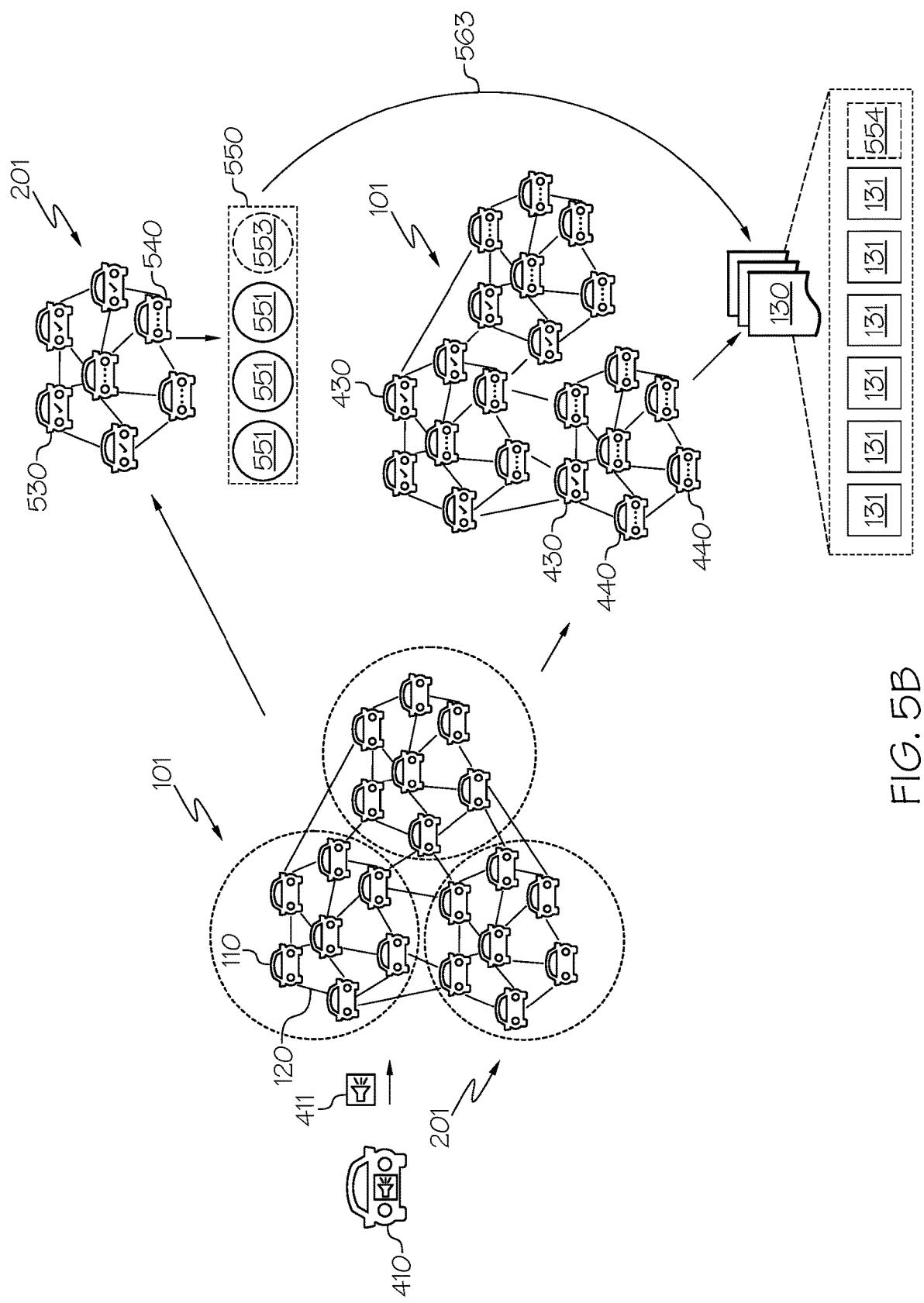
FIG. 5B schematically depicts an example graphical representation of the operations of the decentralized vehicle network having groups of vehicles with group-to-group communication scheme, according to one or more embodiments shown and described herein.

Referring to FIGS. 5A and 5B, example graphical representations of the operations of the decentralized vehicle network having divided groups of vehicles are depicted. The decentralized vehicle network may divide the plurality of vehicles into multiple groups of vehicles, where each divided group of vehicles may have its own local blockchain 550 including multiple local blocks 551. In FIG. 5A, only a divided group may communicate with another divided group, and the vehicles within a divided group may not directly communicate with vehicles in another divided group (i.e., group-to-group communication scheme), while in FIG. 5B, the vehicles of a divided group may directly communicate with vehicles in another divided group (i.e., peer-to-peer communication scheme).

In FIGS. 5A and 5B, a plurality of vehicles 101 are divided into three divided groups 201. The group may be divided based on the location of the vehicles, and the vehicles in a divided group may also be called location vehicles. The division of groups may be based on other conditions, such as equipped sensors onboard. When the first vehicle 410 first reports 411 a change of a road, the change is published in one of the divided groups 201, instead of the whole plurality of vehicles 101. The decentralized vehicle network may pick a divided group 201 where the local vehicles as a whole have a greater chance to validate or invalidate the change. For example, the decentralized vehicle network may choose a divided group based on location when the local vehicles of the divided group have a greater chance to drive through the scene of the change.

After being selected, the local vehicles of the selected group may vote for the change. The local vehicles that vote positively to endorse the change are denoted as local endorsing vehicles 530 and the local vehicles that vote neutrally or negatively for the change are denoted as local non-endorsing vehicles 540. In FIGS. 5A and 5B, the divided group 201 has four local endorsing vehicles 530, and three local non-endorsing vehicles 540. The decentralized vehicle network then decides whether to integrate a local block containing the change into the local blockchain 550 based on the number of local endorsing vehicles 530. A local block 553 may be integrated into the local blockchain 550 when at least a local threshold number of the local vehicles endorse the change. The local threshold number may have similar characteristics to the threshold number described in FIG. 4. For example, in FIG. 5A, the local threshold number may be 50% of the local vehicles of the divided group 201. Since more than 50% of the local vehicles of the divided group 201 endorse the change (four out of seven local vehicles endorse the change), a local block 553 is integrated into the local blockchain 550.

After the local blockchain 550 is integrated, the decentralized vehicle network may determine whether to publish the change in the plurality of the vehicles 101. In a group-to-group communication scheme, such as in FIG. 5A, a determination 562 whether to publish the change in the plurality of the vehicles 101 may depend on the satisfaction of a condition 561. The condition may be whether a local blockchain 550 containing the change is integrated into the local blockchain 550. After the condition 561 is satisfied, the change is published in the other divided groups and received by the local vehicles for voting. In a peer-to-peer communication scheme, such as in FIG. 5B, the change may be published in the plurality of the vehicle 101 without satisfaction of the condition 561.

After the change is published in the plurality of the vehicles 101, the vehicles 110 in the plurality of the vehicles vote positively, neutrally, or negatively for the change. The decentralized vehicle network then determines based on the endorsements made by the vehicles 110 whether to integrate a block 554 into the global blockchain 130, in a similar manner as described in FIG. 4. After all or at least a majority of vehicles 110 vote for the change, the decentralized vehicle network may agree to integrate the block 554 if at least a global threshold number of the vehicles in the decentralized vehicle network endorse the change (i.e. vote positively). A global threshold number of vehicles may be less than a majority of the plurality of the vehicles 101, such as 30% of the plurality of the vehicles 101, or 6 vehicles. For example, as illustrated in FIGS. 5A and 5B, there are 7 vehicles or ⅓ of the plurality of the vehicles endorse the change. The decentralized vehicle network determines it is sufficient to satisfy the condition of integration and integrate the block 554 containing the change into the global blockchain 130 including blocks 131. In a peer-to-peer communication scheme such as in FIG. 5A, the integration of a local block may be used as an additional condition in determining whether to integrate the block 554 into the global blockchain 130.

Comparing the peer-to-peer communication scheme as in FIG. 5B and the group-to-group communication scheme as in FIG. 5A, the group-to-group communication scheme asks a local block to be integrated into the local blockchain before publishing the change to the plurality of the vehicles 101. The advantages of the group-to-group communication scheme lie in that the communication between the local vehicles may be faster and more efficient: once the selected group determines not to integrate the local block, the vehicles of other divided groups 201 do not need to vote for the change. The advantages of the peer-to-peer communication scheme lie in that the communication is more decentralized and resilient to failures. For example, a global block may be integrated under the peer-to-peer communication scheme but not under the group-to-group scheme when more vehicles out of the selected group may have visited the scene of the change and could endorse the change. On balance, the decentralized vehicle network may choose between the two schemes considering the size of the plurality of the vehicles 101, the communication technologies adopted for data transfer, and other factors related to change detection.

Figure 6:
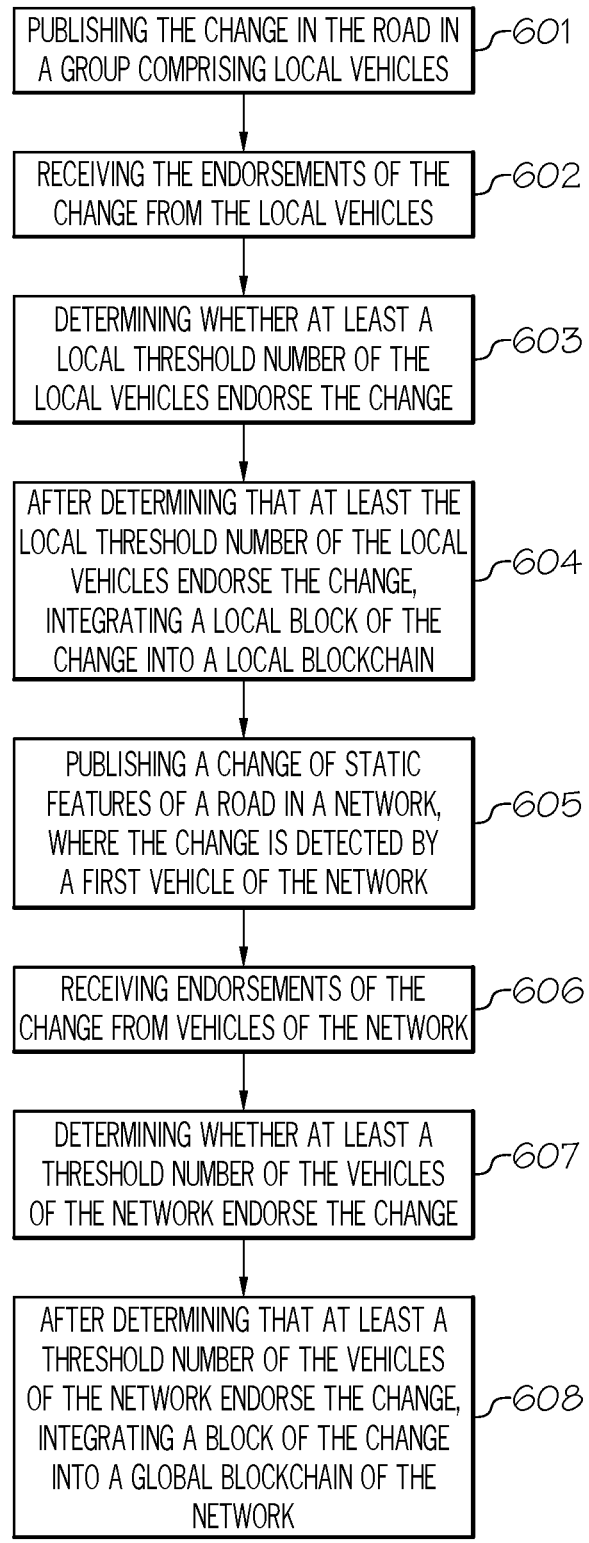
FIG. 6 illustrates a flow diagram of illustrative steps for implementing a block into a blockchain of the decentralized vehicle network, according to one or more embodiments shown and described herein.

Referring to FIG. 6, a flow diagram of illustrative steps for implementing a block into a blockchain of the decentralized vehicle network is depicted. At block 601, the method for implementing a block into a blockchain of the decentralized vehicle network includes publishing the change in the road in a group including local vehicles. At block 602, the method for implementing a block into a blockchain of the decentralized vehicle network includes receiving the endorsements of the change from the local vehicles. At block 603, the method for implementing a block into a blockchain of the decentralized vehicle network includes determining whether at least a local threshold number of the local vehicles endorse the change. At block 604, the method for implementing a block into a blockchain of the decentralized vehicle network includes after determining that at least the local threshold number of the local vehicles endorse the change, integrating a local block of the change into a local blockchain. At block 605, the method for implementing a block into a blockchain of the decentralized vehicle network includes publishing a change of static features of a road in a network, where the change is detected by a first vehicle of the network. At block 606, the method for implementing a block into a blockchain of the decentralized vehicle network includes receiving endorsements of the change from vehicles of the network. At block 607, the method for implementing a block into a blockchain of the decentralized vehicle network includes determining whether at least a threshold number of the vehicles of the network endorse the change. At block 608, the method for implementing a block into a blockchain of the decentralized vehicle network includes after determining that at least a threshold number of the vehicles of the network endorse the change, integrating a block of the change into a global blockchain of the network.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A network comprising:
   a first vehicle operable to detect a change of static features of a road;
   a local blockchain comprising a local block of changes; and
   a global blockchain comprising blocks of changes, wherein:
      a block of the change of static features of the road is integrated into the local blockchain when the change is detected by the first vehicle that first published the change in the network and at least a local threshold number of local vehicles endorse the change;
      a block of the change of static features is integrated into the global blockchain when the change is included in the local blockchain and at least a global threshold number of vehicles endorse the change;
      the change of the static features of a road comprises a change of a geometric feature of the road, the change of the geometric feature comprising a change of pavement widths, a change of horizontal alignment, a change of vertical alignment, a change of slope channelization, a change of intersections, or a combination thereof;
      the integrated change of static feature of the global blockchain is configured to be applied to one or more map systems for a map update.

2. The network of claim 1, wherein the static features further comprise traffic signs on the road, and mid- and long-term constructions of the road.

3. The network of claim 1, wherein a vehicle other than the first vehicle is operable to endorse the change by detecting the change using a sensor.

4. The network of claim 1, wherein the first vehicle is operable to endorse the change by redetecting the change using a sensor.

5. The network of claim 1, wherein the local threshold number of the local vehicles is 50% of the local vehicles.

6. A network comprising:
   vehicles operable to detect a change of static features in a road, where the vehicles are divided into groups of local vehicles;
   a plurality of local blockchains comprises local blocks of changes, wherein after a first vehicle publishes a change of the road among a group of local vehicles, a block of the change is integrated into a local blockchain when at least a local threshold number of the local vehicles endorse the change;
   a global blockchain comprising blocks of changes, wherein a block of the change is integrated into the global blockchain when the change is included in a local block, and at least a global threshold number of the vehicles endorse the change;
   wherein the change of the static features of a road comprises a change of a geometric feature of the road, the change of the geometric feature comprising a change of pavement widths, a change of horizontal alignment, a change of vertical alignment, a change of slope channelization, a change of intersections, or a combination thereof, and
   the integrated change of static feature of the global blockchain is configured to be applied to one or more map systems for a map update.

7. The network of claim 6, wherein the static features further comprise traffic signs on the road, and mid- and long-term construction of the road.

8. The network of claim 6, wherein a vehicle other than the first vehicle is operable to endorse the change by detecting the change using a sensor.

9. The network of claim 6, wherein the first vehicle is operable to endorse the change by redetecting the change using a sensor.

10. The network of claim 6, wherein the global threshold number of the vehicles is 50% of the vehicles, and the local threshold number of the local vehicles is 50% of the local vehicles.

11. The network of claim 1, wherein the global threshold number of the vehicles is 50% of the vehicles.

12. The network of claim 1, wherein the vehicles other than the local vehicles do not vote for the change of static features when the local the block of the change of static features of the road is not integrated into the local blockchain.

13. The network of claim 6, wherein the vehicles other than the local vehicles do not vote for the change of static features when the local the block of the change of static features of the road is not integrated into the local blockchain.

* * * * *